June 11, 1957     J. ZUERCHER     2,795,147
SELF-CENTERING ROLLER
Filed Oct. 21, 1952
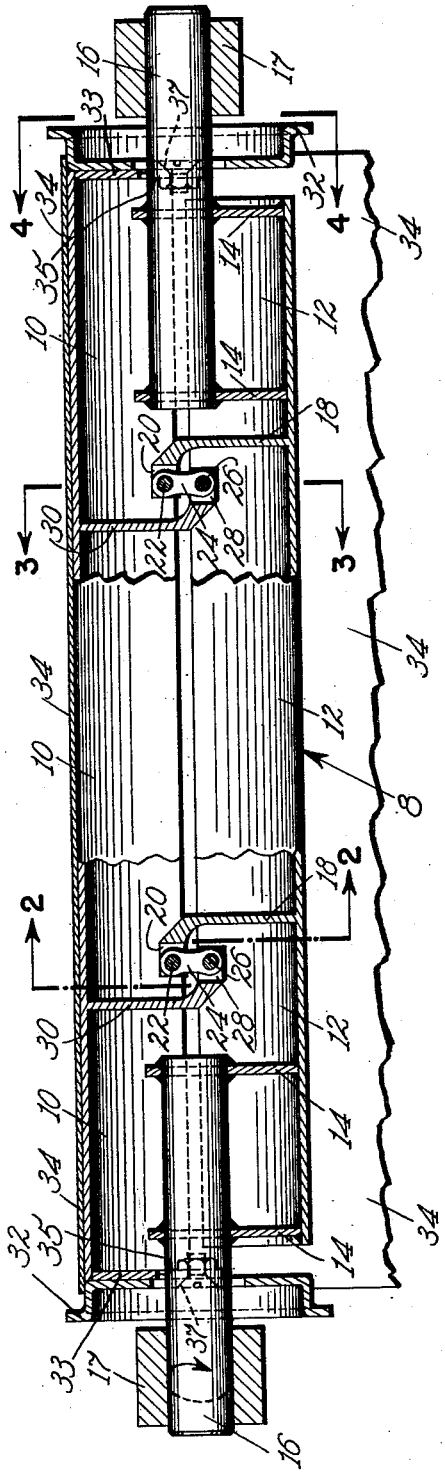
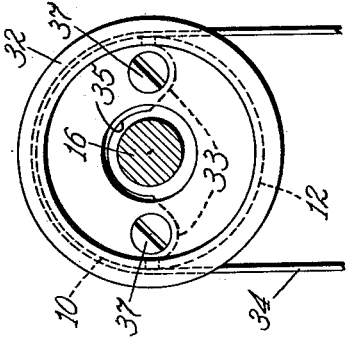
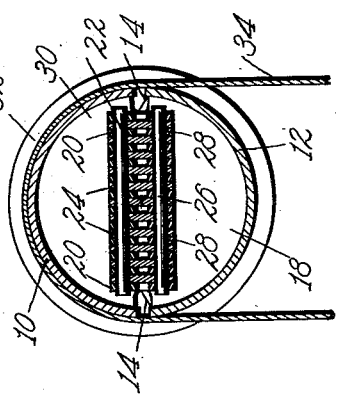
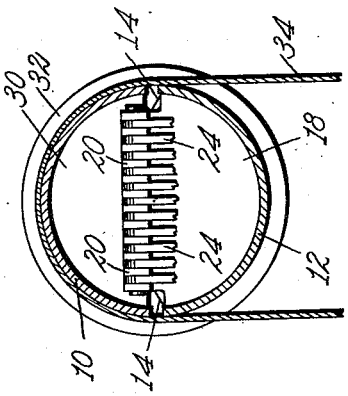
INVENTOR
JOHN ZUERCHER
BY
ATTORNEY

United States Patent Office 2,795,147
Patented June 11, 1957

2,795,147

SELF-CENTERING ROLLER

John Zuercher, Buffalo, N. Y., assignor to American Machine & Foundry Company, a corporation of New Jersey Application October 21, 1952, Serial No. 315,861

8 Claims. (Cl. 74—241)

This invention relates to rotary self-aligning devices, and more particularly to self-aligning rollers, pulleys or other rotary structures which may be either driven or driving or idling insofar as their use is concerned.

It is known that in the operation of endless belts, such as conveyor belts, there is a tendency for the belt to move from one side to the other. This movement is undesirable because, among other things, it increases wear on the belt and therefore shortens its useful life.

The present invention consists in the provision of a simple rugged, self-aligning rotary member or pulley which in operation automatically aligns the endless belt passing thereover and therearound. In this manner, the pulley is used to center the belt. It can be used as the driving member, the driven member, or an idling member. A preferred form of pulley or roller embodying the invention includes a fixed hemi-cylindrical section mounted for rotation on suitable shaft means, such as trunnions, and movable hemi-cylindrical section connected to the fixed section by means of links which allow the movable section to move axially and radially relative to the fixed section in disposing and maintaining a belt running on the pulley in proper centered relationship It is an object of the invention to provide a novel self-aligning device having means which coact in response to the sidewise travel of a belt carried thereby to automatically effect such relative movement of the pulley parts that the belt becomes automatically centered or located in proper aligned position with respect to the pulley.

It is a further object of the invention to provide a novel self-aligning rotary structure formed of a plurality of arcuate members which can shift axially or relative one to the other, such that when used as a pulley, the belt traveling thereover is automatically shifted and centralized with respect to the ends of the pulley or roller.

The invention also consists in the provision of a pulley or roller formed of one laterally movable hemi-cylindrical part and one non-laterally movable part. The movable part is provided with flanged ends such that upon engagement of the edge of the belt with a flanged end as the belt moves sidewise with respect to the pulley, a relative movement is effected between the hemi-cylindrical parts and a shifting of one part with respect to the other, whereby in this manner proper centering and guiding of the belt is always obtained.

Other and further objects will become apparent upon a consideration of the following description of a preferred, but not necessarily the only, form of invention taken in connection with the drawings accompanying and forming a part of the specification.

In the drawings:

Fig. 1 is a sectional side elevation of a self-aligning rotary member, such as a pulley, embodying a preferred form of the invention;

Fig. 2 is a sectional end elevation taken on line 2—2 of Fig. 1;

Fig. 3 is a sectional end elevation taken on line 3—3 of Fig. 1; and

Fig. 4 is an end elevation taken on line 4—4 of Fig. 1.

Referring to the drawings, the rotary self-aligning member shown herein for purposes of illustration is a pulley or flanged roller designated generally 8. This pulley consists of two complementary hemi-cylindrical parts 10 and 12 which when positioned in operative relationship, as shown in the drawings, provide a cylindrical surface on which belt 34 is supported for operation. Pulley 8 can be used equally well as a driving, or driven, or idling pulley.

As shown in Fig. 1, hemi-cylindrical part 12 is provided with two pairs of spaced brackets 14 suitably fixed on the inner wall thereof as by welding. One bracket 14 of each pair is mounted closely adjacent the end of part 12, the other bracket 14 of each pair being spaced longitudinally inwardly therefrom. Rigidly fixed to brackets 14 are axially aligned stud shafts 16 which project outwardly beyond the ends of part 12, and form the rotatable supporting means for pulley 8. The free ends of shafts 16 are rotatably journaled in suitable bearings 17.

Also mounted on the inner portion of hemi-cylindrical part 12 is a plurality of spaced brackets, such as disc shaped ribs or lugs 18. The number of brackets 18 will vary in accordance with the length of a particular pulley or roller. In the embodiment shown, two brackets 18 are provided. The upper free end of each of the brackets 18 is provided with a slotted bearing head 20 which carries a pin 22 supporting a plurality of spaced links 24, see Figs. 2 and 3. The other ends of links 24 are pivotally connected to another pin 26 located parallel with and beneath pin 22, as shown in Figs. 1 and 3. Pin 26 is held and supported in a slotted bearing head 28 formed in brackets 30 suitably attached to the inner portion of hemi-cylindrical part 10, which is provided with the same number of brackets 30 as brackets 18 in part 12.

Adjacent each end of part 10 is attached or formed integrally therewith a substantial half disc-shaped end member 33 which is provided with a centrally cut out portion 35 in order that shaft 16 may extend therethrough and the relative axial movement between parts 10 and 12 can be unobstructed. Mounted on end members 33 are flanged plates 32 adapted to be engaged by belt 34 as it moves to the left or right, as viewed in Figure 1. Flanges 32 are secured to end members 33 by screws 37.

In operation, whenever belt 34 tends to move sideways during the rotation of pulley 8 and engages one of the flanges 32 as the belt moves off center on pulley 8, the pressure of the belt against flange 32 engaged thereby and the centrifugal force cause a displacement of the hemi-cylindrical part 10 sideways, thereby resulting in the movement of chain links 24 off dead center. In the continued rotation of pulley 8 through 180°, belt 34 moves onto the fixed part 12 of pulley 8, and at this time centrifugal force exerted on movable part 10 causes the latter to move still further sideways. Then when the pulley turns 180° further in its rotation, and belt 34 runs thereon, part 10 moves back towards the position shown in Fig. 1 with links 24 on dead center due to the force created by the belt tension and in so doing, belt 34 is relocated on pulley 8 in substantially centered arrangement. In this manner, the proper centering of belt 34 within tolerance is always assured by the coaction between the two hemi-cylindrical parts 10 and 12 of pulley 8 embodying the invention. Pulley 8 may be rotated by any suitable well known driving device (not shown) or driven by belt 34.

The invention above described may be varied in construction within the scope of the claims, for the particular embodiments selected to illustrate the invention are but a few of the possible concrete forms which my invention may assume. The invention, therefore, is not to be restricted to the precise details of the structures shown and described.

What I claim is:

1. In a self-aligning pulley, a pulley body comprising complementary opposed first and second substantially hemi-cylindrical members, hinge means connecting said members to each other for relative axial and radially outward movement, shaft means fixed to said first member supporting said pulley for rotation, a belt running on said members, and belt engaging flanges on said second member and adjacent each end thereof.

2. In a self-aligning pulley, a pulley body comprising a first substantially hemi-cylindrical member, means fixed to said member and supporting it for rotation, a second substantially hemi-cylindrical member coacting with said first-named substantially hemi-cylindrical member to form a generally cylindrical belt supporting surface, a belt running on said surface, means connecting said second substantially hemi-cylindrical member and said first-named member together for relative axial and radially outward movement, and belt engaging flanges on said second member and adjacent the ends thereof adapted to be engaged by the edge of said belt for displacing said member sidewise during a portion of the rotation of said pulley body, said second member being operative in response to centrifugal force due to the rotation of said pulley body during a part of each rotation thereof when said belt is running on said first member for further displacing said second member sidewise and radially outward, and said belt being operative in response to its engagement with said displaced second member upon running off said first member during the continued rotation of said pulley body for moving said second member radially inwardly and axially to center said belt on said pulley.

3. In a self-aligning pulley, rotatable support means, a substantially hemi-cylindrical member fixed to said support means, a complementary substantially hemi-cylindrical member, links mounted within said hemi-cylindrical members hingedly connecting said complementary member to said fixed member for conjoint axial and radially outward and inward movement of said complementary member relative to said fixed member, said members together forming a general cylindrical belt supporting pulley body, and belt engaging means on said complementary member and adjacent the ends thereof adapted to be engaged by the edge of a belt running on said pulley body for displacing said complementary member sidewise during a portion of the rotation of said pulley body, said complementary member being operative in response to centrifugal force due to the rotation of said pulley body during a part of each rotation thereof when said belt is running on said fixed member for further displacing said complementary member sidewise and radially outward, and said belt being operative in response to its engagement with said displaced complementary member upon running off said fixed member during the continued rotation of said pulley body for moving said complementary member radially inwardly and axially to center said belt on said pulley body.

4. A self-aligning pulley comprising a first elongated arcuate body member, shaft means fixed to said body member supporting it for rotation, a second complementary elongated arcuate body member adapted to form with said first-named body member a generally cylindrical belt supporting surface, opposed brackets mounted interiorly and in spaced relationship on the interior of said body members, floating means connecting said brackets and connecting said second arcuate complementary body member to said first elongated arcuate body member for relative axial and radially outward and inward movement, belt engageable means on said second complementary arcuate member and adjacent the ends thereof adapted to be engaged by the edge of a belt running on said belt supporting surface for displacing said second complementary body member sidewise during a portion of the rotation of said pulley body, said second complementary arcuate body member being operative in response to centrifugal force due to the rotation of said body members on said shaft means during a part of each rotation thereof when a belt is running on said first elongated arcuate body member for further displacing said second complementary elongated arcuate member axially and radially outward, and said second complementary elongated arcuate member being operative in response to said belt running off said first member and onto said second member and the radial pressure exerted by said belt thereon to move radially inwardly and axially to center said belt on said pulley body.

5. A self-aligning rotary belt supporting structure comprising an elongated arcuate member, means fixed to said member supporting it for rotation, a complementary elongated arcuate member coacting with said first-named member to form a generally cylindrical belt supporting body, means connecting said members together for relative axial and radially outward movement, said means including complementary sets of brackets located in axial spaced relationship on the interior of said members, each of said brackets having a length greater than the radius of the circle of which each of said members forms an arc, and the free ends of each of said brackets being provided with a transverse bore, and links connecting the free ends of said brackets including pivot pins extending through the free ends of said links and said bores, the centers of the pivot pins of the links connecting each set of brackets lying in a plane substantially at right angles to the longitudinal axis of said rotary structure.

6. A self-aligning rotary belt supporting structure comprising an elongated arcuate member, means fixed to said member supporting it for rotation, a complementary elongated arcuate member coacting with said first-named member to form a generally cylindrical belt supporting body, means connecting said members together for relative axial and radially outward movement, said means including complementary sets of radially inwardly directed brackets located in axial spaced relationship on the interior of said members, each of said brackets having a length greater than the radius of the circle of which each of said members forms an arc, and links extending between and connecting the free ends of said brackets with the center lines of said links normally lying in planes substantially at right angles to the longitudinal axis of said rotary structure; and belt engaging flanges on said complementary elongated arcuate member and adjacent each end thereof.

7. A self-aligning rotary belt supporting structure comprising an elongated arcuate member, means fixed to said member supporting it for rotation, a complementary elongated arcuate member coacting with said first-named member to form a generally cylindrical belt supporting body, means connecting said members together for relative axial and radially outward movement, said means including complementary sets of radially inwardly directed brackets located in axial spaced relationship on the interior of said members, each of said brackets having a length greater than the radius of the circle of which each of said members forms an arc with the free ends of each complementary sets of brackets extending substantially at right angles to the length thereof and radially spaced from each other, and links pivotally connecting said free ends of each set of brackets; and belt engaging flanges on said complementary elongated arcuate member and adjacent each end thereof.

8. In a self-aligning pulley, a pulley body comprising a first hemi-cylindrical member and a second substantially hemi-cylindrical member, means connecting said members to each other for relative axial and radial movement, shaft means fixed to said first-named member supporting said pulley body for rotation, and a belt passing about said members, said second named member being operative in response to lateral movement of said belt thereon and pressure exerted thereon by said belt to move sidewise and radially outward during a portion of the rotation of said pulley body, and said second member being operative in response to centrifugal force due to the rotation of said pulley body during a part of each rotation thereof when said belt is running on said fixed member for further displacing said second member sidewise and radially outward, and said belt being operative in response to its engagement with said displaced second member upon running off said fixed member during the continued rotation of said pulley body for moving said second member radially inwardly and axially to center said belt on said pulley body.

References Cited in the file of this patent

UNITED STATES PATENTS

| | | |
|---|---|---|
| 2,301,545 | Hlavaty | Nov. 10, 1942 |
| 2,334,768 | Hlavaty | Nov. 23, 1943 |